Patented Mar. 25, 1952

2,590,810

UNITED STATES PATENT OFFICE 2,590,810

PREPARATION OF VINYL CHLORIDE

Robert B. Young, Pittsfield, Mass., assignor to General Electric Company, a corporation of New York No Drawing. Application August 5, 1950, Serial No. 177,971

7 Claims. (Cl. 260—656)

This invention relates to the preparation of vinyl chloride. More particularly the invention is concerned with a method of making vinyl chloride easily and in good yields which comprises passing a mixture of acetylene and hydrogen chloride in the vapor phase over a catalyst for the reaction comprising a copper salt deposited on a porous carbon adsorbent.

Various methods are disclosed in the prior art for making vinyl chloride by the reaction of acetylene and hydrogen chloride. For instance, in U. S. 1,903,894 is disclosed the use of mercuric chloride as a catalyst for the preparation of vinyl chloride. However, as is true in the case of all mercuric halide catalysts there is a tendency for the mercuric halide catalyst to volatilize and thus reduce the life of the catalyst. Attempts to minimize this effect by making a double salt with the mercuric halide have not been too successful although some improvement has been noted. In U. S. 1,812,542—Nieuwland, is disclosed a method for preparing vinyl chloride by passing a mixture of acetylene and hydrogen chloride over a catalyst mass comprising a solution of a mixture of ingredients comprising ammonium chloride, hydrochloric acid, cuprous chloride and copper powder. This water solution of the copper chloride mass does effect conversion of the acetylene and hydrogen chloride to vinyl chloride but it is subject to the disadvantage that the catalyst is rapidly exhausted and is for the most part a batch process. In addition, the yields obtained by this method are not too satisfactory and there are formed during the reaction undesirable by-products which materially affect the yield of vinyl chloride.

A patent which is similar to U. S. 1,812,542 is a later U. S. Patent No. 1,934,324 which is also concerned with the preparation of vinyl chloride by the passage of acetylene and hydrogen chloride over a compact mass. In this case the compact mass comprises a water mixture of hydrogen chloride, calcium chloride and cuprous chloride. The use of such an aqueous solution of catalysts is disadvantageous in that again the catalyst life is materially reduced after a short passage of acetylene and the hydrogen chloride over the catalyst. Moreover, the yields are quite low in this process as will be evident from a reading of the patent which indicates that about a 26% conversion of acetylene to vinyl chloride was realized in each passage of the acetylene.

I have now discovered that unexpectedly I am able to prepare vinyl chloride from acetylene and hydrogen chloride on a continuous basis with high yields of the order of from about 95 to 100 percent during the entire passage of the acetylene and hydrogen chloride by passing the latter mixture over a catalyst consisting essentially of a copper salt adsorbed on a solid carbon adsorbent. In the practice of my invention the catalyst has an extremely long life and the effectiveness thereof is essentially on the same level from the start to the finish of the reaction. The catalyst can be employed for days on end without any loss in the effectiveness theerof in the conversion of the acetylene and hydrogen chloride to vinyl chloride. Moreover, the catalyst can be prepared quite readily and requires no mixtures of salts which may harm the catalyst or in any way affect the conversion to the vinyl chloride.

In accordance with my invention, the catalyst for the reaction may be prepared by adsorbing a solution of the copper salt onto a porous carbon adsorbent, for example, carbon pellets, etc. The adsorbed copper salt is then premitted to stand in contact with the adsorbent for a period of time until it appears to be dry. Thereafter, it can be used without further processing in the reaction. Among the copper salts which may be employed are, for example, cuprous chloride, cupric chloride, copper bromide, sulfates of copper, for example, cupric sulfate, nitrates of copper, for example, cupric nitrate, organic acid salts of copper, for example, cupric acetate, etc., copper compounds, e. g., copper oxide which may be converted to a copper salt during solution, for instance, during solution in the HCl prior to adsorption on the carbon adsorbent.

The porous adsorbent onto which the copper salt is adsorbed may comprise any one of the many forms of porous carbon, for example, granulated charcoal, activated carbon, charcoal pellets, etc. I prefer to use as the catalyst in the reaction cuprous chloride adsorbed on activated carbon or charcoal pellets.

The temperature at which conversion of the acetylene and hydrogen chloride to vinyl chloride by passage over the copper salt may be conducted may be varied within certain limits realizing, of course, that the present reaction is a vapor phase reaction. Thus, I may use temperatures ranging from about 100° to 200° C., preferably from about 125° to 190° C. during the entire reaction. I have found that temperatures of the order of about 130° to 185° C. give under many conditions optimum yields. However, the actual temperatures employed will depend, for example, on the rate at which the acetylene and hydrogen chloride are passed through the reaction vessel, the length of the reaction tube and the catalyst bed, the concentration of the acetylene and hydrogen chloride, catalyst employed, etc.

The ratio of hydrogen chloride to acetylene employed during the course of the reaction may, of course, be varied within wide limits depending on various factors. Generally, I prefer to employ a slight molar excess of the hydrogen chloride over the acetylene, and usually on a volume basis about 5 parts hydrogen chloride may be employed to 4 parts acetylene. This, of course, can be varied within wide limits without departing form the scope of the invention, as will be apparent to those skilled in the art, and I do not intend to be limited to any particular proportion in this respect.

After passage of the acetylene and hydrogen chloride over the catalyst bed, the reaction products are condensed in low temperature traps to convert the gaseous vinyl chloride to a liquid state for storage and analysis purposes. In addition, the unreacted acetylene and hydrogen chloride, if any, can also be condensed in the low temperature trap and can be recycled to the process without difficulty.

In order that those skilled in the art may better understand how the present invention may be practiced the following examples are given by way of illustration and not by way of limitation. All parts are by weight.

Example 1

The cuprous chloride catalyst in this example was prepared by adsorbing cuprous chloride on activated carbon in a finely divided state. More particularly 90 parts cuprous chloride was dissolved in about 268 parts reagent grade concentrated hydrochloric acid (37% HCl, 1.19 specific gravity) and this solution was slowly poured onto 300 parts activated charcoal pellets (4/8 mesh). Considerable heat was evolved. After standing for about one hour with occasional shaking, the solution was completely adsorbed on the charcoal pellets and the catalyst appeared to be dry. A glass tube reactor about 15 inches long and 1½ inches in diameter was partially filled with this catalyst mass and placed in an oil bath. The oil bath was heated and dry hydrogen chloride gas was passed through the catalyst to drive out any residual hydrochloric acid in the catalyst. Thereafter gaseous hydrogen chloride was started through the reactor and when the bath temperature had reached about 130°–160° C., approximately a 5 to 4 by volume mixture of gaseous hydrogen chloride and gaseous acetylene was started through the reactor. The total volume of reactants was of the order of about 360 ml. per minute. The bath temperature was controlled at around 170° C. (±3° C.). As a result of the passage of the acetylene and hydrogen chloride over the above-prepared catalyst bed it was found that for 32 hours of the reaction there was obtained 100% vinyl chloride based on the amount of acetylene used, while for 108 hours the yield of vinyl chloride based on the acetylene was 95% or better. It was also found that the activity of the catalyst dropped only slightly even after 108 hours of continuous use. Increases in the reaction temperature or decreases in the flow rate of the reactants all resulted in increased vinyl chloride yields. It was also found that by-products such as acetaldehyde and ethylidene dichloride were less than 5% of the acetylene used throughout the reaction.

Example 2

In this example catalysts were prepared in the same manner as in Example 1 by adsorbing cupric chloride, cupric sulfate, cupric nitrate and cupric acetate on activated carbon pellets and each of the catalysts in the adsorbed state was employed in a glass reaction tube using about 3 ft. of catalyst bed while acetylene and hydrogen chloride were passed over the respective catalysts under essentially the same conditions as employed in Example 1. The run using cupric chloride (19.2% $CuCl_2$ of contact mass) was conducted for about 76 hours at about 170° C., and gave a continuous yield of vinyl chloride varying from about 95 to 100% conversion of the acetylene. The yield of vinyl chloride at a temperature of about 172° C. in connection with the use of cupric sulfate (23.1% by weight of catalyst mass) was about 99 to 100%.

When the cupric nitrate (23.1% by weight of catalyst mass) was used as a catalyst, the conversion to vinyl chloride was about 99.3% at a reaction temperature of 171° C., while the cupric acetate (21.4% by weight of catalyst mass) on carbon gave a yield of 99.8% vinyl chloride at a reaction temperature of 165° C.

When controls were conducted using instead of the catalyst bed such as the one described above, such catalysts as activated charcoal alone which had been treated with reagent grade concentrated hydrochloric acid, a catalyst comprising non-adsorbed solid cuprous chloride mixed with carbon pellets, or cuprous chloride adsorbed in the form of a concentrated hydrochloric acid solution onto silica aerogel, or cuprous chloride adsorbed on pumice, or cupric chloride adsorbed on pumice, or zinc chloride plus nickel chloride adsorbed on carbon, the following results were obtained at the reaction temperatures listed and under otherwise comparable conditions and times of reactions:

| Catalyst | Reaction Temperature | Percent Conversion of Acetylene to Vinyl Chloride |
|---|---|---|
| | ° C. | |
| Carbon pellets alone with concentrated hydrochloric acid | 162 | 18 |
| Solid cuprous chloride mixed with carbon pellets (23.1% $Cu_2Cl_2$) | 170 | 19 |
| Cuprous chloride on silica aerogel (13% $Cu_2Cl_2$) | 150 | 24 |
| Cuprous chloride plus concentrated hydrochloric acid adsorbed on pumice (20% $Cu_2Cl_2$) | 170 | 3.5 |
| Cupric chloride in ethanol-water solution adsorbed on pumice and dried (26.2% $CuCl_2$) | 170 | 5.5 |
| Zinc chloride plus nickel chloride in ethanol solution on carbon pellets and dried (11.6% each of zinc chloride and nickel chloride) | 170 | 30 |

From the foregoing table it is clearly apparent that the vapor phase passage of acetylene and hydrogen chloride over an adsorbed copper salt on a carbon adsorbent gives unexpected and unobvious improvements in yields of vinyl chloride as compared to many other similar catalysts adsorbed either on the same type of adsorbent or the same type of catalyst adsorbed on different adsorbents, such as, for example, pumice or silica aerogel.

It will, of course, be apparent to those skilled in the art that other catalyst concentrations, temperatures of reaction, proportions of reagents, etc., may be employed without departing from the scope of the invention. Generally, I prefer to use cuprous chloride as the catalyst adsorbed on activated charcoal pellets. This latter combination when used within the temperature range described previously gives outstanding conversions of the reactants to vinyl chloride and permits continuous operation of the reaction without any perceptible loss in the activity of the catalyst. Moreover, messy preparations of catalysts are avoided and the process can be adapted to factory techniques with a minimum of equipment and a minimum of trained personnel.

The monomeric vinyl chloride obtained in accordance with my invention may be polymerized forthwith by itself (without further purification indicating extremely high purity of vinyl chloride) or with other copolymerizable materials, for example, vinyl acetate, to form useful and valuable resinous compositions which have utility in the coating and insulating arts.

What I claim as new and desire to secure by Letters Patent of the United States is:

1. The method of making vinyl chloride which comprises passing acetylene and hydrogen chloride both in the vapor phase over a copper salt adsorbed on a carbon adsorbent, said copper salt being selected from the class consisting of copper halides, copper sulfates, copper nitrates, and copper acetates.

2. The method of making vinyl chloride which comprises passing at an elevated temperature acetylene and hydrogen chloride both in the vapor phase over cuprous chloride adsorbed on carbon pellets.

3. The method of making vinyl chloride which comprises passing at an elevated temperature acetylene and hydrogen chloride both in the vapor phase over cupric sulfate adsorbed on carbon pellets.

4. The method of making vinyl chloride which comprises passing at an elevated temperature acetylene and hydrogen chloride both in the vapor phase over cupric nitrate adsorbed on carbon pellets.

5. The method of making vinyl chloride which comprises passing at an elevated temperature acetylene and hydrogen chloride both in the vapor phase over cupric acetate adsorbed on carbon pellets.

6. The method which comprises passing a gaseous mixture of acetylene and hydrogen chloride at an elevated temperature over a catalytic contact mass comprising porous carbon pellets having adsorbed thereon cupric chloride.

7. The method of preparing vinyl chloride which comprises passing at a temperature of from about 100° to 200° C. a mixture of gaseous ingredients comprising acetylene and hydrogen chloride over a cuprous chloride catalyst adsorbed on porous carbon pellets wherein the volume ratio of acetylene and hydrogen chloride is about 4 to 5.

ROBERT B. YOUNG.

REFERENCES CITED

The following references are of record in the file of this patent:

UNITED STATES PATENTS

| Number | Name | Date |
| --- | --- | --- |
| 2,265,286 | Japs | Dec. 9, 1941 |
| 2,488,560 | Reitlinger | Nov. 22, 1949 |